United States Patent [19]

Börger et al.

[11] Patent Number: 4,886,438

[45] Date of Patent: Dec. 12, 1989

[54] METHOD AND APPARATUS OF EXTRUDING A PLASTIC PIPE UNDER CONTROL OF THE WALL THICKNESS OF THE EXTRUDED PLASTIC PIPE

[76] Inventors: Koos Börger, Orionlaan 50; Hans Overeljnder, Mercuriuslaan 6, both of, Hardenberg, Netherlands

[21] Appl. No.: 163,029

[22] Filed: Mar. 2, 1988

Related U.S. Application Data

[60] Division of Ser. No. 885,073, Jul. 14, 1986, Pat. No. 4,749,531, which is a continuation of Ser. No. 686,535, Dec. 26, 1984, abandoned.

[30] Foreign Application Priority Data

Dec. 27, 1983 [NL] Netherlands ........................ 8304451

[51] Int. Cl.⁴ ............................................. B29C 47/92
[52] U.S. Cl. ..................................... 425/141; 425/144; 425/378.1
[58] Field of Search ................ 425/141, 143, 144, 145, 425/150, 378.1

[56] References Cited

U.S. PATENT DOCUMENTS

| | | | |
|---|---|---|---|
| 3,808,879 | 5/1974 | Rogers | 73/622 |
| 3,955,425 | 5/1976 | Corneau | 73/637 |
| 4,137,028 | 1/1979 | Reitemey et al. | 425/141 |
| 4,157,503 | 6/1979 | Brunner | 425/141 |
| 4,209,476 | 6/1980 | Harris | 425/145 |
| 4,425,289 | 1/1984 | Lee et al. | 425/141 |
| 4,425,290 | 1/1984 | Upmeier et al. | 425/141 |
| 4,475,399 | 10/1984 | Livingston | 73/638 |
| 4,512,943 | 4/1985 | Hahn et al. | 425/141 |
| 4,548,570 | 10/1985 | Hahn et al. | 425/141 |
| 4,551,289 | 11/1985 | Schwab et al. | 264/23 |
| 4,793,788 | 12/1988 | Börger et al. | 425/141 |

FOREIGN PATENT DOCUMENTS

| | | | |
|---|---|---|---|
| 2234876 | 1/1973 | Fed. Rep. of Germany | 423/144 |
| 2542331 | 9/1976 | Fed. Rep. of Germany | 425/141 |

OTHER PUBLICATIONS

Rotherham, et al., "Extrusion of Rigid PVC Pipe", British Plastics, Jul. 1969, pp. 125-127.

*Primary Examiner*—Willard Hoag
*Attorney, Agent, or Firm*—A. Robert Theibault

[57] ABSTRACT

A pipe of thermoplastic polymer, e.g. polyvinylchloride is extruded by an extruder comprising an extrusion die (2) having a moulding end part (2a) with heating elements (11) located about said end part. The wall thickness of the pipe is controlled in order to obtain a pipe of a substantially even wall thickness. For said control the wall thickness of the extruded pipe is measured at 360 points equally distributed over the circumference and moreover the average is determined in eight measuring sectors comprising 45 measuring points per sector. The average of the measuring values of one measuring sector is compared with the circumferential average of the 360 points, the deviation of the desired wall thickness in said one sector being counter balanced by the action of the heating elements. In a preferred embodiment a polyvinylchloride pipe obtained by means of an two screw extruder presents an even wall thickness over the circumference.

5 Claims, 3 Drawing Sheets

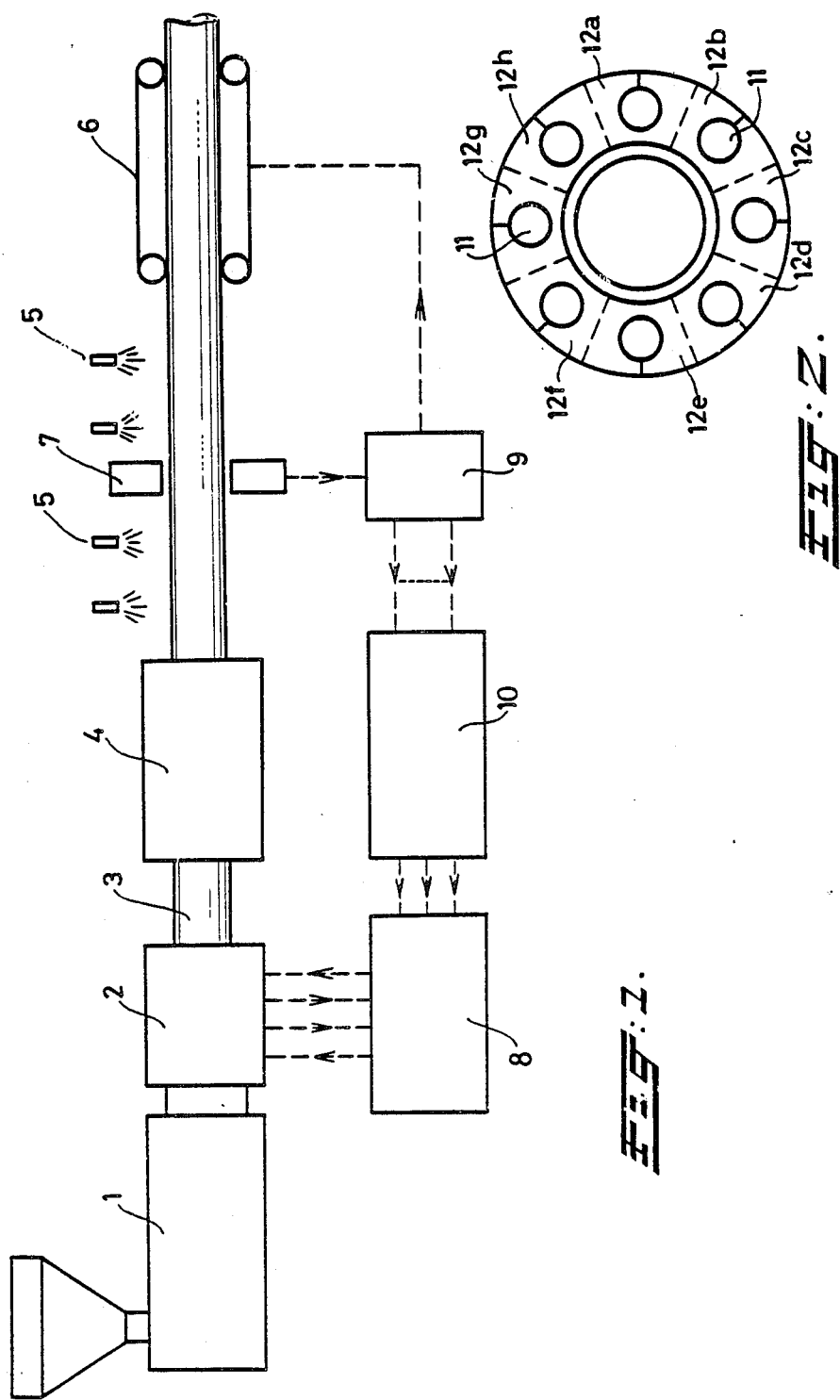

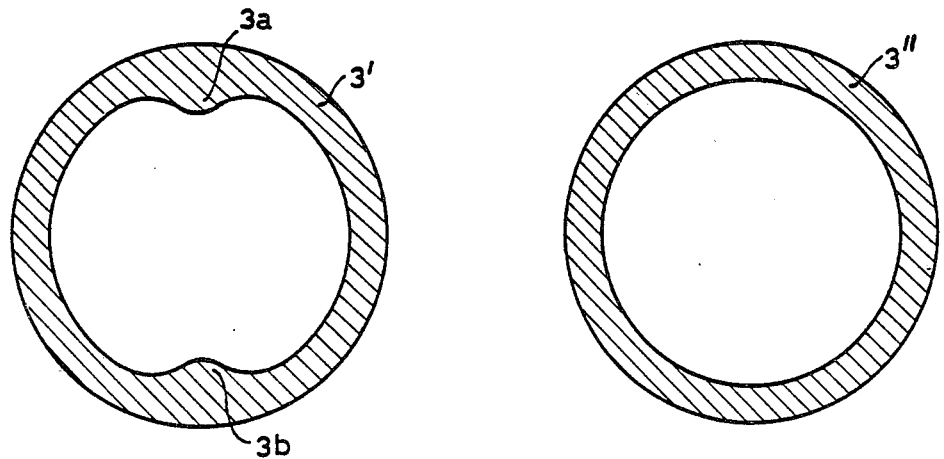
FIG: 6a.   FIG: 6b.
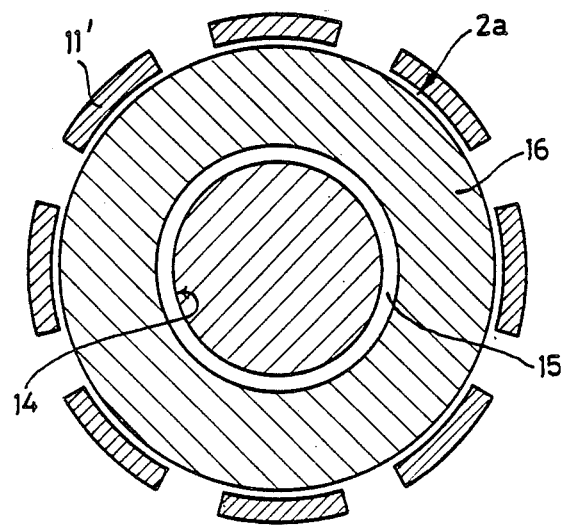
FIG: 5.

METHOD AND APPARATUS OF EXTRUDING A PLASTIC PIPE UNDER CONTROL OF THE WALL THICKNESS OF THE EXTRUDED PLASTIC PIPE

This application is a divisional of application Ser. No. 06/885,073, filed July 14, 1986, which is a continuation of application Ser. No. 06/686,535, filed Dec. 26, 1984.

BACKGROUND OF THE INVENTION

1. Field of the Invention

The invention relates to a method of extruding a rigid plastic pipe of a thermoplastic polymer and controlling the wall thickness of the extruded pipe by means of a screw extruder provided with an extrusion die comprising a moulding end part, the temperature in each of several temperature-controlled sectors disposed about the moulding end part of the extrusion die being controlled as a function of the measurements of the wall thickness at a number of measuring points, each located in measuring sectors which lie in the axial extension of the temperature-controlled sectors and more particularly to a method of extruding a rigid polyvinylchloride pipe in this way.

By the expression a rigid plastic pipe is meant a pipe being flexible or not having such a wall thickness that this pipe maintains substantially its shape during storage at a flat support and does not collapse.

2. Description of the Prior Art

A method of this kind is known from Dutch patent application 72 09 444. According to this known method, the wall thickness of the pipe, at a point where an extruded plastic pipe has assumed solid form, is measured by means of a backscatter-type sensing device rotating about the pipe, whereupon the signals emanating from the sensing device are transmitted to a control unit. From this control unit, signals are sent to heat supply or heat-removal elements provided in each of a number of individual temperature-control sectors disposed about the moulding end part of the extrusion die, thus effecting the temperature in each of said temperature-control sectors. As the flow rate of the melted plastic in the moulding end part of the extrusion die varies in accordance with the temperature, the thickness of the plastic pipe will consequently change in such a temperature-control sector area.

Said known method has the drawback that it is difficult to obtain a pipe having a thickness which is very even over the entire circumference of the pipe notwithstanding a regular distribution of the heat supply or heat removal elements about the circumference of the pipe.

This disadvantage is particularly important in pipes obtained by extruders having two screws which pipes comprise principally two opposite thickened wall parts extending in a longitudinal direction of the pipe.

In such cases these disadvantages cannot be removed by a better centering of the core in relation to the wall of the moulding end part of the extrusion die.

SUMMARY OF THE INVENTION

The invention aims to overcome the abovementioned disadvantages.

This object is attained according to the invention in that the wall thickness is measured in at least one measuring sector at several points circumferentially located next to one another the average of these measurement values is determined and compared with the average of the values measured in all measured sectors, and the temperature in the temperature-controlled sector located in the axial extension of the one measuring sector aforementioned is controlled as a function of the difference observed so as to remove the difference measured.

More particularly the invention relates to a method of extruding a rigid polyvinylchloride pipe and controlling the wall thickness of the extruded pipe, the temperature in each of several temperature-controlled sectors disposed about the moulding end part of the extrusion die of a screw extruder being controlled as a function of the measurements of the wall thickness at a number of measuring points, each located in measuring sectors, which lie in the axial extension of the temperature-controlled sectors, wherein in applying an extruder comprising at least two screws the wall thickness is measured in at least one measuring sector at several points circumferentially located next to another, the average of these measurement values is determined and compared with the average of the values measured in all measuring sectors, and the temperature in the temperature-controlled sector located in the axial extension of the one measuring sector aforementioned is controlled as a function of the difference observed so as to remove the difference measured.

Measuring the wall thickness at several points circumferentially located next to each other and comparing these values with an average of measurement values is known per se for plastic foil tubes.

However in this process the wall thickness differences are adjusted by means of cooling elements provided outside the moulding end part of an extrusion die.

Acting upon heating elements in a moulding end part of an extruder die for foil tube is possible but causes undesired side effects in the foil tube. In extruding foil tube the whole wall thickness of the foil tube will immediately obtain the temperature given by the heat supply or heat removal elements. This leads to more stretch in the hot regions in comparison with less hot regions during the inflation of the foil tube and thus the foil tube will have a smaller wall thickness in these regions in maintaining the other parameters at a constant value, such as outlet velocity.

In extruding a rigid pipe the heat supply elements will only increase the temperature of a superficial layer of the pipe permitting a more rapid extrusion of the pipe and thus increasing the pipe wall thickness apart from maintaining constant parameters such as the outlet velocity.

More particularly it should also be noted that in the foil tube the wall thickness is adjusted by cooling behind the moulding end part of the extrusion die being less accurate than the compensation of a too small wall thickness of a plastic pipe by supplying heat to the moulding end part of the extrusion die.

As in the method of the invention wall thickness deviations from the average wall thickness are compensated, the result is a very uniform wall thickness over the circumference of the pipe.

In order to improve the uniformity of the wall thickness, the wall thickness is measured in all measuring sectors at several points circumferentially located next to eachother.

Preferably, the wall thickness is measured at 360 points equally distributed over the circumference, and the average is determined in eight measuring sectors at 45 measuring points per sector.

In this manner, a particularly even wall thickness is obtained.

Preferably. the various signal processing operations are performed by microprocessors.

This enables differences in wall thickness to be eliminated very rapidly and in a simple manner, and consequently a plastic pipe to be made whose wall thickness over the circumference of the pipe is quite uniform over an unlimited length.

The invention also relates to an apparatus for executing the process of the invention comprising a screw extruder with an extrusion die comprising a moulding end part and disposed about said moulding end part temperature-control elements being active in temperature-control sectors, at least one wall-thickness measuring device for measuring the wall thickness of an extruded pipe, said measuring device being capable of performing measurements in all measuring sectors located in the axial extension of the temperature control sectors, wherein at least one measuring sector, a wall-thickness measuring device can perform several measurements and transmit such measurement data to a signal processing unit wherein said measurement data are averaged and the data measured in all measuring sectors can also jointly be transmitted to a signal processing unit wherein said measurement data are averaged, a comparator element being provided for comparing the two values of the measurement-value averaging operation, said comparator element being capable of acting upon a temperature-control device for controlling the temperature of the heating elements in a temperature-control sector located in the axial extension of the one measuring sector aforementioned.

Such an apparatus has a very simple and inexpensive constructions, and can therefore be easily put to use.

Preferably the apparatus comprises a screw extruder having at least two screws.

The invention also relates to a plastic pipe of a thermoplastic polymer, particularly a polyvinylchloride pipe, obtained by means of an apparatus according to the invention.

More particularly the invention relates to a polyvinylchloride pipe obtained by means of a screw extruder having at least two screws, wherein the polyvinylchloride pipe is substantially free from thickened wall zones being substantially opposite each other.

At last the invention also relates to a measuring device and temperature controlling device suitable for use in an apparatus according to the invention.

Other claims and many of the attendant advantages will be more readily appreciated as the same becomes better understood by reference to the following detailed description and considered in connection with the accompanying drawings in which like reference symbols designate like parts throughout in figures.

DESCRIPTION OF THE DRAWINGS

FIG. 1 is a diagrammatic side view of a plastic-tube extruder comprising an apparatus for controlling the wall thickness according to the invention;

FIG. 2 is a front view of the extrusion die as used with an extruder according to FIG. 1;

FIG. 5 represents a diagrammatic cross-section of another extrusion die as used with an extruder according to the invention, and FIG. 6a a cross section of a plastic pipe obtained by an extruder comprising two screws according to the prior art; and FIG. 6b a cross section of the same plastic pipe obtained according to the invention.

DESCRIPTION OF THE PREFERRED EMBODIMENTS

Figure 3:
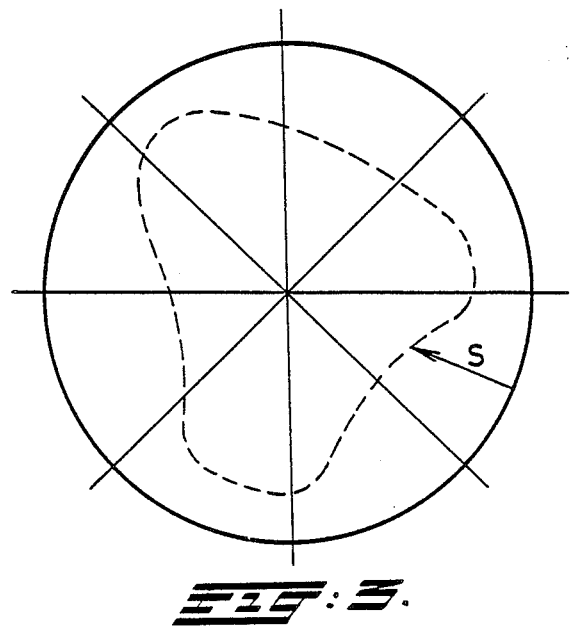
FIG. 3 shows a wall-thickness profile as measured over the circumference of a tube.
Figure 4:
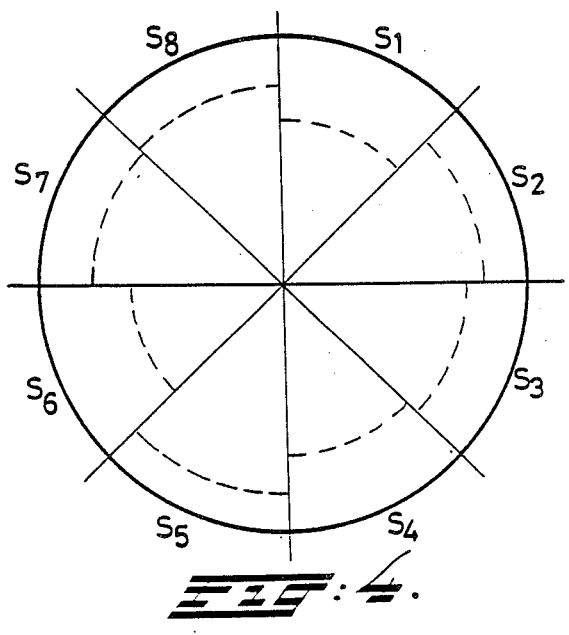
FIG. 4 represents the average wall-thickness profile per measuring sector.

FIG. 1 shows an installation for manufacturing plastic pipe comprising an extruder with an extrusion die 2 comprising a moulding end part 2a from which the pipe issues. Said moulding end part 2a and the extrusion die 2 comprise a core 14 and a wall 16 bounding an annular extrusion slit 15. The extruder extrudes through the extrusion die and at last the moulding end part of said extrusion die. The pipe of polyvinylchloride 3, passes after extrusion successively through a calibrating device 4, a cooling arrangement 5 and a drawbench 6.

The installation furthermore comprises a sensing device 7 rotatable about the pipe and enabling the pipe wall thickness to be measured by means of ultrasonic waves at several points distributed over the circumference.

Provided around moulding end part of the extrusion die 2 are heating elements 2 which enable the temperature to be influenced in a number of temperature-control sectors 12a-12h around the moulding end part of the extrusion die. The various heating elements 11 are connected to a control unit 8 for controlling the temperature in each of the temperature-control sectors 12a-12h.

In addition, the installation comprises a first signal processing unit 9 the input of which is connected to a sensing device 7 and one output of which is connected to the drawbench 6, another output of which being connected to the input of the second signal processing unit 10. The output is of the second signal processing unit 10 is connected to the temperature-control unit 8.

The apparatus operates in the following manner.

During extrusion of a rigid thermoplastic pipe 3, e.g. PVC pipe, the sensing device 7 rotates about the pipe and continually or intermittently measures the pipe wall thickness at a number of points distributed over the pipe circumference. Plotting the values measured over the circumference of the pipe in a diagram results in the diagram of FIG. 3 which shows diagrammatically the wall-thickness profile of the pipe. At a certain point, the wall thickness is indicated by S.

The signals coming from the sensing device 7 are transmitted to the first signal processing unit 9 wherein the minimum value of the wall thickness is determined and compared with the minimum wall thickness desired. The difference between these values is used to set the speed of the drawbench. Thus, the overall thickness of the pipe 3 is being controlled, an increase of the drawbench speed generally resulting in a thinner pipe and a decrease of the speed generally resulting in a thicker pipe. Signals corresponding to wall thickness as measured at the various points distributed over the circumference are transmitted from the first signal processing unit 9 to the second signal processing unit 10. The latter determines, with respect to a number of measuring sectors of the pipe-wall circumference corresponding to the temperature-control sectors 12a-12h about the moulding end part 2a of the extrusion die, the average of the values measured in said measuring sectors 13a-13h as well as the average of all values measured over the circumference. The diagram of FIG. 3 shows the average tube-wall thickness profile per measuring sector 13a–13h, the sector averages being indicated by S1–S8.

The sector average for each of the measuring sectors 13a–13h is compared with the circumferential average, and the value desired of the temperature of the extrusion-die temperature-control sector corresponding the the measuring sector concerned of the tube circumference is adjusted in the temperature-control unit 8 as determined by the deviation of the sector average from the circumferential average, in a manner so that the deviation is reduced or eliminated. In the event, for example that the sector average S1–S8 is lower than the circumferential average, the temperature in the corresponding temperature-control sector of the moulding end part 2a of the extrusion die 2a is rasied, as a result of which in the location of said temperature-control sector the melt encounters less resistance in the moulding end part 2a of the extrusion die 2, thus locally causing more material to flow through the moulding end part 2a of the extrusion die. Consequently, the wall thickness of the pipe will locally increase.

In this manner, the wall thickness of the pipe 3 at various points distributed over the circumference is controlled as much as possible according to an average value. In conjunction with the control per se known of the minimum pipe wall thickness by means of the control of the speed of the drawbench 6, a well thickness is obtained which is quite uniform over the circumference and which is very close to the minimum wall thickness desired. It is thus possible to save plastic material while forming a plastic pipe which meets all requirements as to strength characteristics. As it takes some time before a section of the tube 3 leaving the moulding end part 2a of the extrusion die 2 reaches the sensing device 7, proper delays have been built into the control.

This also applies to the drawbench-speed control. In the present embodiment of the system, the wall thickness is measured at 360 points uniformly distributed over the circumference, and the wall thickness average is determined for eight measuring sectors distributed over the pipe circumference and each having 45 measuring points. Also, the number of temperature-control sectors disposed about the moulding end part 2a of the extrusion die is obviously eight. The various signal processing operations are performed by means of microprocessors.

FIG. 5 shows a cross section of the moulding end part 2a of an extrusion die 2, but now the heating elements 11' are located at the outer side of the wall 16 of moulding end part 2a.

EXAMPLE

A polyvinylchloride pipe of 160 mm diameter and 3.2 mm required minimum wall thickness (nominal values) is extruded by means of a two screw extruder without applying the invention.

From measuring data appears that the inner side of the pipe comprises two thickened wall zones of 3.7 mm being opposite each other and therebetween two thin wall zones having a thickness of about 3.4 mm. Such a pipe 3' is shown in FIG. 6a showing the thickened zones 3a and 3b.

Use of the process of the invention and measuring the wall thickness at 360 points equally distributed over the circumference and the average is determined in eight measuring sectors having 45 measuring points per sector, provides the same polyvinylchloride pipe 3'' (FIG. 6b) without said thickened wall zones. The pipe presents over the whole circumference a pipe wall thickness of about 3.3 mm.

It will be obvious that similar results are obtained with thermoplastic polymers different from polyvinylchloride.

We claim:

1. Apparatus for extruding a solid rigid plastic pipe of a thermoplastic polymer and controlling the wall thickness of the extruded pipe, said apparatus comprising a twin screw extruder with an entrusion die excluding inflation means and disposed about said die heating elements in the absence of cooling elements for controlling the temperature in each of a plurality of temperature controlled sectors, circumferential average temperature measuring means at least one wall thickness measuring device for measuring the wall thickness of an extruded pipe, said measuring device being rotatable about the circumference of the pipe and being operable to perform measurements in each of a plurality of measuring sectors equally distributed about the pipe periphery located in the axial extension of the temperature controlled sectors, an element for comparing a wall thickness measuring value with another wall thickness value, a device connected with the heating means and speed controllable drawing means for drawing off the plastic pipe body leaving the extrusion die, the wall thickness measuring device being operable to transmit signals representative of such measurements to a signal processing unit wherein the measurement signals are averaged and the signals measured in all measuring sectors are jointly transmitted to a wall thickness controlling unit connected thereto, said thickness control unit comprising a signal, processing unit for determining sector averages and circumferential temperature average for the pipe and a comparator element for comparing the sector temperature average with the circumferential temperature average, said comparator element being capable of acting upon a temperature control device for controlling the temperature of said heating elements in the absence of cooling means in a temperature controlled sector located in the axial extension of the one measuring sector as a function of the observed difference between the sector average and the circumference average so as to remove the measured thickness difference, said heating being effective to affect only the temperature of a superficial layer of the plastic pipe body and thus reducing or increasing the friction between the outside of the plastic pipe body and the opposite inner surface of the die part, a too small wall thickness being increased by increasing the temperature and a too high wall thickness being decreased by decreasing the temperature in said temperature controlled sectors, and control means connected with the signal processing unit for controlling the speed of the drawing means by using the difference between the minimum value of the wall thickness as desired and the minimum value of the wall thickness as determined in the signal processing unit starting from the signals coming from the wall thickness measuring device.

2. Apparatus according to claim 1, wherein the extruder comprises at least two screws.

3. Apparatus according to claim 1, characterized in that said wall-thickness measuring device is capable of measuring the wall thickness at 360 measuring points uniformly distributed over the circumference, and each measuring sector comprises 45 measuring points.

4. Apparatus according to claim 1, wherein the wall thickness measuring device is rotatable about the circumference of an extruded pipe.

5. Apparatus according to claim 1, wherein said signal processing unit and the compartor element are microprocessors.

* * * * *